US007118642B2

(12) United States Patent
Bakoš et al.

(10) Patent No.: US 7,118,642 B2
(45) Date of Patent: Oct. 10, 2006

(54) METHOD AND PLANT FOR THE MANUFACTURE OF GREEN TYRES

(75) Inventors: Štefan Bakoš, Púchov (SK); Jozef Žemla, Púchov (SK); Ján Šedik, Beluša (SK); Peter Mahálik, Povaľská Bystrica (SK)

(73) Assignee: Matador A. S., Puchov (SK)

( * ) Notice: Subject to any disclaimer, the term of this patent is extended or adjusted under 35 U.S.C. 154(b) by 223 days.

(21) Appl. No.: 10/509,615

(22) PCT Filed: Apr. 9, 2003

(86) PCT No.: PCT/SK03/00007

§ 371 (c)(1),
(2), (4) Date: Sep. 29, 2004

(87) PCT Pub. No.: WO03/084737

PCT Pub. Date: Oct. 16, 2003

(65) Prior Publication Data

US 2005/0161162 A1    Jul. 28, 2005

(30) Foreign Application Priority Data

Apr. 9, 2002    (SK) .................................. 480-2002

(51) Int. Cl.
*B29D 30/20*    (2006.01)
(52) U.S. Cl. ...................... 156/111; 156/396; 156/406.2
(58) Field of Classification Search ................ 156/111, 156/396, 406.2, 123, 133, 126
See application file for complete search history.

(56) References Cited

U.S. PATENT DOCUMENTS

| | | | |
|---|---|---|---|
| 5,213,651 A * | 5/1993 | Fukamachi et al. ...... | 156/406.2 |
| 5,399,225 A | 3/1995 | Miyamoto et al. .......... | 156/396 |
| 5,540,803 A | 7/1996 | Miyamoto et al. .......... | 156/396 |
| 5,582,666 A | 12/1996 | Irie ............................. | 156/111 |
| 5,853,525 A | 12/1998 | Irie ............................. | 156/396 |
| 5,948,207 A | 9/1999 | DeVrieas et al. ........... | 156/396 |

FOREIGN PATENT DOCUMENTS

| EP | 503532 A | 9/1992 |
|---|---|---|
| RU | 2002632 C | 11/1993 |

OTHER PUBLICATIONS

Derwent WPI Abstract of RU 2002632 C1, WPI Acc. No. 1994-080874/ 199410.

* cited by examiner

*Primary Examiner*—Geoffrey L. Knable
(74) *Attorney, Agent, or Firm*—Ohlandt, Greely, Ruggiero & Perle, LLP; George W. Rauchfuss, Jr.

(57) ABSTRACT

The assembly of devices for production of green tyres, consisting of a belt building drum, tread building drum, band drum for preparing a carcass and a forming drum and further includes devices for transferring particular components or assemblies of the components from one device to another, an apparatus for placing and holding a bead and the carcass assembly, stiching unit, and particular servisers for supplying materials to particular devices. The assembly of devices is arranged into two parallel transfer tracks 20 and 50 and includes the band drum 30 for preparing carcass assembly, the tyre building drum 130, the apparatus 150 for placing and holding the head and the carcass assembly on the first transfer track 20, the apparatus 150 is disposed between the said band drum 30 for preparing the carcass assembly, and the tyre-building drum 130. On the second transfer track 50 there are belt drum 60, band drum 70 for winding a tread around the belt and a first transfer ring 80 between the said belt drum 60 and band drum 70 for winding a tread all being movably disposed. There is an auxiliary track 90 arranged in a horizontal plane above the place 140 of assembly, the auxiliary track runs at right angles in relation to the first and second transfers tracks (20, 50). Under the auxiliary track 90 there is a second transfer ring for transferring a belt-tread assembly on the place 140 of assembly movably hand on the said track 90.

15 Claims, 4 Drawing Sheets

METHOD AND PLANT FOR THE MANUFACTURE OF GREEN TYRES

TECHNICAL FIELD

The invention concerns an assembly of devices for production of green tyres, consisting of several devices arranged to an assembly, which allows continuous linking manufacture of one component to another and their subsequent completing, resulting in the green tyre. The invention concerns also a method for making green tyres.

BACKGROUND ART

Recently, there are known several methods of green tyre production and the corresponding devices and assembling apparatus. Each of them shows some merits or advantages in comparison with the other, but also some shortcomings. Actually, the structural solution of particular devices, their arrangement and mutual interconnection determines the corresponding method of green tyre production.

Most of the tyre building lines are designed in the so-called single-line arrangement, where the intermediate products necessary for the green tyre production are supplied, pretreated and completed to the final product on tyre building drums, which are usually arranged on one longitudinal axis of the line. In a line with such an arrangement, it is very difficult to utilize new progressive elements concerning both the structural solution of its particular devices and introducing more progressive methods of green tyre production and optimization of the technological process of the production.

Also known are apparatus for green tyre production, the particular stations of which are arranged on several axes. The U.S. Pat. No. 5,853,525 discloses an apparatus for radial tyre production by a method in which the tyre carcass is formed to a cylindrical shape in advance and expanded on a shaping drum so as to wrap the bead core bundles with apices. Subsequently an inner liner is slipped into the carcass in a first transfer ring, the ply having a smaller diameter than that of the carcass cylinder and being pressed against its inner surface, thus creating a first assembly. During this time on a second band forming drum, sidewalls and reinforcing bands are formed into a cylindrical shape to wrap the bead cores so as to provide a second assembly of sidewalls having a smaller diameter than that of the first assembly. At that time the first transfer ring holding the first assembly and the second band drum are moved coaxially relative to each other. After the second assembly is arranged in a predetermined position within the first assembly, the second assembly is expanded and pressed against the first assembly, thus creating a third assembly. The first transfer ring and the shaping drum move to a determined position and the third assembly, disposed in the first transfer ring, is transferred onto the shaping drum. Then the shaping drum is expanded and the bead core holders move against each other to create a round form of the shaped green tyre. A belt-tread assembly which has been previously formed into a cylindrical shape on a further band drum, is supplied by means of a second transfer ring and attached to the third assembly during shaping. Herewith the green tyre production is completed. Servisers with the corresponding materials are assigned to all of the above drums.

This method can be accomplished on an apparatus which is arranged on two parallel axes, the first and the second band drum as well as a device for supplying the bead cores and plies being arranged on one axis, and the shaping drum and a drum for making the belt-tread assembly in advance being arranged on the second axis.

This method can be accomplished also on an apparatus, which is arranged on three parallel axes, where the second band drum is arranged on the middle axis.

EP 597125 B1 discloses an apparatus for tyre production comprising a band drum, a shaping (building) drum and a device comprising two belt forming drums which can be oscillated or cyclically moved, where the band drum and the device with two belt forming drums are disposed on one axis in opposing relationship. The shaping drum is disposed so that it can be reciprocated between a position on the aforesaid axis, and a stand-by position maintaining the parallel condition with respect to the above axis. The carcass and belt transfer units are disposed so that they can be reciprocated along the aforesaid axis between the band drum and the belt forming device.

EP 880436 B1 describes an apparatus for production of green tyres for vehicles, consisting of a first machine house with two coaxially disposed belt building shafts extending in a first horizontal main direction, where the first shaft is carrying a belt building drum and the second shaft is carrying a tread building drum, this drum being disposed at a greater distance from the first machine house along the first horizontal main direction. Drives for these shafts are independent. The apparatus further comprises a second machine house with a shaft rotating along a second horizontal main direction, which is parallel to the first horizontal main direction. The shaft of the second machine house is carrying two carcass shafts, which are arranged parallel to each other at a certain distance, where the first shaft is carrying a first carcass drum and the second shaft is carrying a second carcass drum. The shafts are driven independently and they are rotationally arranged in such a way that each of them can be brought onto the axis of the first horizontal main direction. The apparatus comprises a transfer track with transfer direction parallel to the first horizontal main direction, on which there are disposed a first transfer ring movable between the belt building drum and the tread building drum, and a second transfer ring movable between the tread building drum and a carcass drum, rotated in line with the axis of the first main direction. On the transfer track, there is disposed a unit for holding and placing the bead cores on the carcass drum, which is rotated in line with the axis of the first main direction. The apparatus further comprises servisers for particular components, a stitching device, disposed below the shaping drum, and a unit for removing the complete tyres.

DISCLOSURE OF INVENTION

The assembly of devices for green tyre production according to the invention is suitable for producing tyres for passenger cars. Such tyres usually consist of inner rubber, on which one or two carcass plies are disposed, the tyres further comprising bead wires with cores, two breaker plies creating together a belt, a narrow strip to be spiralled, sidewalls and tread, where the tread edge may overlap the sidewalls or vice versa. The subject matter of the assembly of devices according to the invention consists in the fact that the devices are disposed on two parallel transfer tracks with a specified place for green tyre completion. On the first transfer track, there is a movably arranged machine house provided with a carcass building drum for making the carcass assembly, which assembly consists of two sidewall bands, inner rubber and carcass plies. A serviser for carcass assembly is assigned to the carcass building drum to supply it with material.

On the second transfer track, there is a movably disposed machine house provided with a belt building drum. On the same track, but in the opposite direction, there is a further movably arranged machine house provided with a tread building drum for winding up the tread and possibly also spiralling the narrow strip which should be disposed between the belt and the tread. The first transfer ring is movably disposed on the same transfer track between the belt building drum and the tread building drum, to transfer the belt from the belt building drum onto the tread building drum for winding up the tread and possibly also spiralling the narrow strip, thus creating the belt-tread assembly. With the belt building drum, there are associated two servisers to supply the belt material, and with the tread building drum for winding up the tread and possibly also spiralling the narrow strip, there are associated a serviser to supply the tread and a winding device for spiralling the narrow strip, with which is associated a serviser for supplying the narrow strip to be spiralled.

A tyre building drum with a machine house is movably arranged on the first transfer track, but in the opposing relation to the carcass building drum. A device for supporting and adjusting the bead cores and for holding the carcass assembly is movably arranged on the first transfer track between the carcass building drum and the tyre building drum. The place for completing the green tyre is located on the first transfer track. An auxiliary transfer track is provided above this place in a horizontal plane above the plane of the first and second transfer track, wherein the auxiliary track is extending perpendicularly to the first and second transfer track. A second transfer ring is movably disposed on the auxiliary track, to transfer the belt-tread assembly to the completing place and, simultaneously, for removing the completed green tyre from the tyre building (shaping) drum. This second transfer ring is suspended on the auxiliary track so that it can move under the track. A stitching device is disposed at the completing place, to shape the edges of the green tyre. The stitching device may be situated either on the inner side of the first transfer track or on the outer side of the first transfer track.

According to a further embodiment the assembly of devices for production of green tyres consists of a first and a second transfer track. Like in the first embodiment, a machine house, carrying a carcass building drum, is movably disposed on the first transfer track, and opposite to it on the same track, there is a machine house, carrying the tyre building drum. A device for supporting and adjusting the bead cores and holding the carcass assembly, which is unmovable along the first transfer track, is disposed at the completing place, which is located on the first transfer track.

On the second transfer track, there is disposed a machine house provided with two drums on one axis, which are carried on two coaxially arranged shafts, wherein the drum, which is closer to the machine house, is the belt building drum, and the drum at a greater distance from the machine house is the tread building drum. With the second drum, there is associated a tread serviser, a winding device for spiralling the narrow strip and a serviser for the narrow strip to be spiralled, like in the first embodiment. A first transfer ring is movably disposed between these drums, to transfer the belt from the belt building drum onto the tread building drum.

A second transfer ring is disposed at the completing place, perpendicularly to the first and second transfer track. This transfer ring is made as a transfer device, comprising 2 to 4 transfer rings, which are rotationally arranged at the completing place in a plane perpendicular to the first and second transfer track. This transfer device extends with one transfer ring to the completing place, and with a further transfer ring in the same plane to the area of the second transfer track. The transfer ring, which is extending to the second transfer track, can be brought to the area of the first transfer track and vice versa, by turning twice by 90°, if the device comprises 4 transfer rings, or by turning once by 180°, if the device comprises 2 transfer rings, around an axis parallel with the transfer tracks.

The assembly of devices according to the first embodiment performs the following operations: The first breaker ply is wound on the belt building drum, which is disposed on the second transfer track, the drum is moved to the second breaker ply serviser and the second breaker ply is wound. The breaker plies are supplied from the breaker ply servisers, oriented perpendicularly to the transfer track. This building drum is moved to a position, in which the first transfer ring can take over the completed belt. The first transfer ring grasps the completed belt from the outside, the drum reduces its diameter and returns to the starting position, and a new cycle of belt building starts. The first transfer ring shifts to the waiting tread building drum and delivers to it the pretreated belt. The tread building drum increases its diameter, thereby accepting the belt, and the narrow strip, supplied from the serviser for the narrow strip to be spiralled, is wound up on the pretreated belt, which is deposited on the winding drum, by the winding device. Subsequently, tread material is supplied from the tread serviser to this drum, and a belt-tread assembly is built up. The tread building drum shifts to the area of the auxiliary track, reduces its diameter and delivers the belt-tread assembly to the waiting second transfer ring, which grasps it from the outside and shifts to the completing place. The tread building drum returns to the starting position and is ready to accommodate the belt and to wind up the tread in the next cycle.

During the preparation of the belt-tread assembly on the building drums on the second transfer track, the carcass assembly, supplied from a combined serviser, is being prepared on the carcass building drum. The carcass assembly comprises sidewalls of the tyre, inner rubber and one or two carcass plies. After the building drum has been shifted into the device for supporting and adjusting the bead cores and holding the carcass assembly, the carcass building drum reduces its diameter and delivers the carcass assembly in the form of a cylinder jacket to the ready device for supporting and adjusting the bead cores and holding the carcass assembly, in which the bead cores and bead apices have been prepared. Subsequently, the carcass building drum is shifted out of the device for supporting and adjusting the bead cores and holding the carcass assembly and it returns into the starting position, where it starts working in the next cycle.

The device for supporting and adjusting the bead cores and holding the carcass assembly grasps the carcass assembly from the outside in such orientation that the bead cores are brought into the correct position, and it shifts to a place, where it delivers the carcass assembly with adjusted bead cores to the tyre building drum and returns to the starting position. The tyre building drum with the carcass assembly is inserted into the ready second transfer ring with the belt-tread assembly and completing the green tyre is started immediately. It means inflating the carcass assembly, bringing the bead cores closer to each other, bending the sidewalls by lever arms, and attaching the belt-tread assembly to the carcass assembly. After the carcass assembly is inflated and the bead cores are close to each other at a predetermined distance, and the carcass assembly touches the ready belt-tread assembly, the belt-tread assembly is released from the second transfer ring. Subsequently, stitching is executed, which is performed by the stitching device, thus forming the green tyre edges. After performing the last operation, the second transfer ring grasps the completed green tyre and shifts to a position, where it is possible to take it away, i.e. to remove it from the area of the green tyre building apparatus.

The assembly of devices according to the second embodiment performs the following operations:

The carcass assembly is prepared in the same way and according to the first embodiment on a carcass building drum, which is disposed on the first transfer track. A machine house with the building drum, carrying the carcass assembly, is shifted to the completing place, where it delivers the ready carcass assembly in the form of a cylinder jacket to the waiting device for supporting and adjusting the bead cores and the carcass assembly. The tyre building drum moves to the completing place and takes over the carcass assembly with supported and adjusted bead cores. After taking over the carcass assembly with the bead cores, the tyre building drum moves to the starting position.

On the second transfer track, breaker material from the breaker servisers is wound up on the belt building drum. The first transfer ring takes over the belt from the belt building drum. After the first transfer ring has taken over the belt and through a short movement of the first transfer ring, the belt is brought above the drum which is further apart from the machine house, thus the tread building drum, to which the belt is delivered by the first transfer ring, to wind the tread over it and possibly also the narrow strip to be spiralled. After the tread has been wound up, thus having finished the cycle on both drums, the machine house, carrying both drums, is shifted on the second transfer track to such position that the drum with the wound up belt-tread assembly is brought to the area of the second transfer ring of the transfer device, which position is in the area above the second transfer track. The second transfer ring of the transfer device extending to the second transfer track receives the belt-tread assembly from the tread building drum in such position of the machine house, which it has assumed after it has been shifted in the direction of the second transfer track.

When the drum is shifted out from the second transfer ring of the transfer device, the transfer device moves the second transfer ring with the belt-tread assembly to the area of the first transfer track, thus to the completing place, through a rotational movement around an axis parallel to the first and second transfer track, in a plane perpendicular to the first and second transfer track at the completing place.

At that time the tyre building drum with ready carcass assembly and adjusted bead cores is slipped into the second transfer ring and the completing starts as described.

Simultaneously with transferring the second transfer ring of the transfer device to the completing place the opposite transfer ring with the finished green tyre, received from the tyre building drum, is transferred from the completing place to an area, where it is possible to remove the completed green tyre by a manipulator or by an operator.

The advantage of the assembly of devices according to the invention consists in that it represents such combination of suitable devices as a whole, which has never been applied yet. Mobility of particular devices and combination of their movements allows to shorten the times of material transfer. The apparatus is designed in such a way, that the mutual arrangement and linking of devices allow to implement progressive elements in an application of the technological process of green tyres production and, simultaneously, they allow not only higher productivity, but also high flexibility and quality of the production. The apparatus for green tyres production is arranged in a so-called two-axis version, which allows to aply the above given advantages.

BRIEF DESCRIPTION OF DRAWINGS

Enclosed

EXAMPLES OF EMBODIMENTS

Example 1

Figure 2:
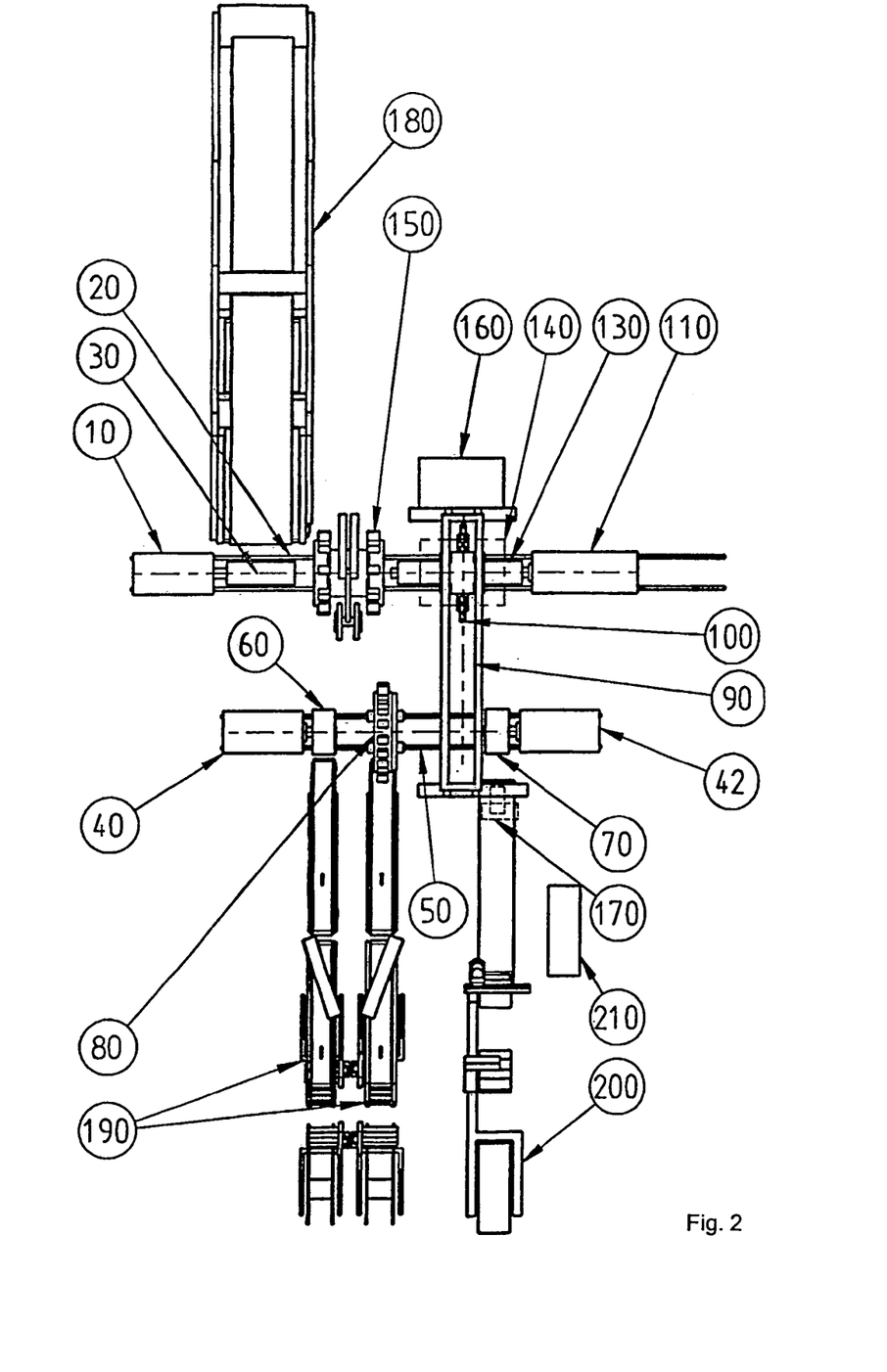

An assembly of devices for production of green tyres, as shown in FIG. 2, is movably disposed on two parallel transfer tracks 20 and 50. On the transfer track 20, there is movably disposed a machine house 10 provided with a carcass building drum 30 for production of the carcass assembly, which consists of two sidewall bands 4, inner rubber 1 and the carcass plies 3. With the winding drum 30, there is associated a serviser 180 to supply it with material.

On the transfer track 50, there is movably arranged a machine house 40, carrying a belt building drum 60. On the same track, but in the opposite direction, there is movably arranged a machine house 42, carrying a winding drum 70 for production of the belt-tread assembly and possibly also for spiralling the narrow strip 6, which should be disposed between the belt 5-and tread 7. A first transfer ring 80 is movably arranged on the transfer track 50 between the building drums 60 and 70, to transfer the belt onto the winding drum 70 for winding up the tread and possibly also the spiralled narrow strip. With the building drum 60, there are associated two servisers 190 for supplying the breaker material, and with the building drum 70, there are associated a serviser 200 for supplying the tread and a winding device 170 for spiralling the narrow strip, with which is associated a serviser 210 for supplying the narrow strip to be spiralled.

A tyre building drum 130 with a machine house 110 is movably disposed on the transfer track 20, but in the opposing relation to the carcass building drum 30. A device 150 for supporting and adjusting the bead cores 2 and the carcass assembly is movably arranged between the building drum 30 and the tyre building drum 130. The place 140 for completing the green tyre is disposed on the transfer track 20. An auxiliary track 90 is provided above this place in a horizontal plane above the planes of the first and second transfer tracks 20, 50, wherein the auxiliary track 90 extends perpendicularly to the first and second transfer track 20, 50. Under the auxiliary track 90, there is a second transfer ring 100 movably suspended on it to deliver the belt-tread assembly to the completing place 140, and, simultaneously, to carry the ready green tyre away. Also a stitching device 160 is disposed at the completing place from the outside of the track 20.

Figure 4:
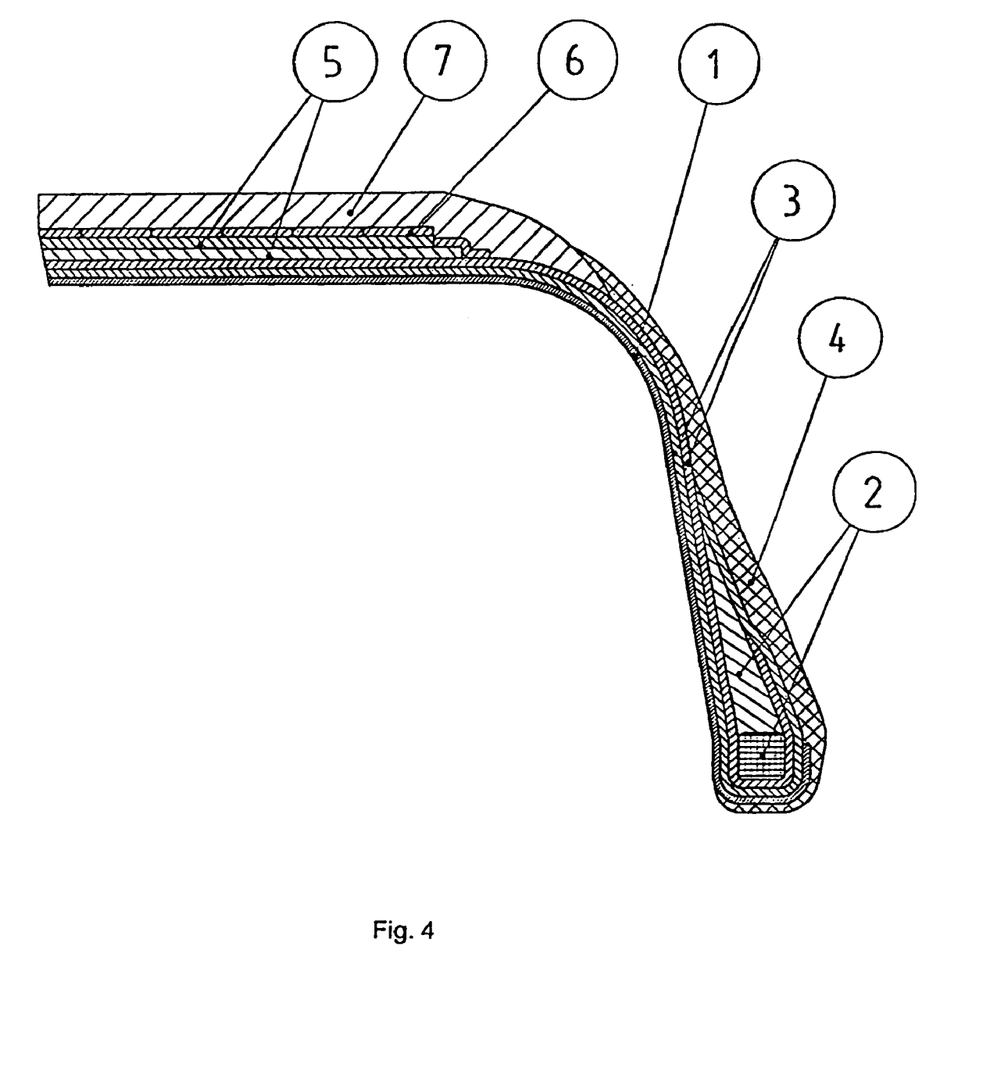
FIG. 4 shows a partial section view of a green tyre.

The tyres produced in the assembly of devices according to the invention usually consist of the inner rubber 1 with the carcass plies 3 disposed on it, and further comprise the bead cores 2, two breaker plies 5, creating the belt, the spiralled narrow strip 6, the tyre sidewalls 4 and the tread 7, where the edge of the tread 7 may overlap the sidewalls 4 or vice versa.

The assembly of devices, as shown in FIG. 2, operates as follows: First and second breaker ply 5, delivered from the servisers 190, are wound up on the building drum 60 and the building drum 60 is moved to a position, in which it can be taken over by the first transfer ring 80, which grasps it from the outside, the drum 60 reduces its diameter and returns to the starting position, and a new cycle of breaker ply winding starts. The transfer ring 80 shifts to the waiting winding drum 70 and delivers to it the pretreated belt. The drum 70 increases its diameter, whereby receiving the belt, and the narrow strip 6, supplied from the serviser 210 for the narrow strip to be spiralled, is spiralled on the pretreated belt, deposited on the winding drum 70, by the device 170. Subsequently, tread material is supplied from the tread serviser 200 to the drum 70, and a belt-tread assembly is built up. The winding drum 70 is shifted to the area of the auxiliary track 90, reduces its diameter and delivers the belt-tread assembly to the waiting second transfer ring, which grasps it from the outside and shifts to the completing place 140. The drum 70 returns to the starting position and is ready-to wind up the belt in the next cycle.

During the preparation of the belt-tread assembly on the building drums 60 and 70 on the track 50, a carcass assembly, supplied from the serviser 180, is being prepared on the building drum 30. The carcass assembly comprises the tyre sidewalls 4, the inner rubber 1 and one or two carcass plies 3. After the building drum 30 has been shifted into the device 150 for supporting and adjusting the bead cores and the carcass assembly, it reduces its diameter and delivers the carcass assembly in the form of a cylinder jacket to the ready device 150 for supporting and adjusting the bead cores and the carcass assembly, in which the bead wires and bead cores 2 have been prepared in advance. The drum 30 is shifted out of the device 150 and it returns to the starting position and starts working in the next cycle.

The device 150 for supporting and adjusting the bead cores and the carcass assembly clamps the carcass assembly from the outside in such orientation, in which the bead cores 2 are brought into the right position, and it shifts to a place, where it delivers the carcass assembly with adjusted bead cores and carcass assembly to the tyre building drum 130. The tyre building drum 130 increases its diameter, whereby receiving the material from the device 150, and at the completing place 140 it is shifted into the second transfer ring 100 and the green tyre completing is started immediately, involving inflating the carcass assembly, bringing the bead cores closer to each other, bending the sidewalls by lever arms, and attaching the belt-tread assembly to the carcass assembly. After the carcass assembly has been inflated and the bead cores have been brought close to each other at a predetermined separation, and the carcass assembly touches the ready belt-tread assembly, the belt-tread assembly is released from the second transfer ring 100. Subsequently, the stitching is executed, which is performed by the stitching device 160, whereby the green tyre edges are formed. After performing the last operation, the second transfer ring 100 grasps the completed green tyre and it shifts to a position, where it is possible to remove it, i.e. to remove it from the area of the apparatus for production of the green tyre. The second transfer ring 100 performs any movements only along a track, which is perpendicular to the parallel tracks 50 and 20.

Example 2

Figure 1:
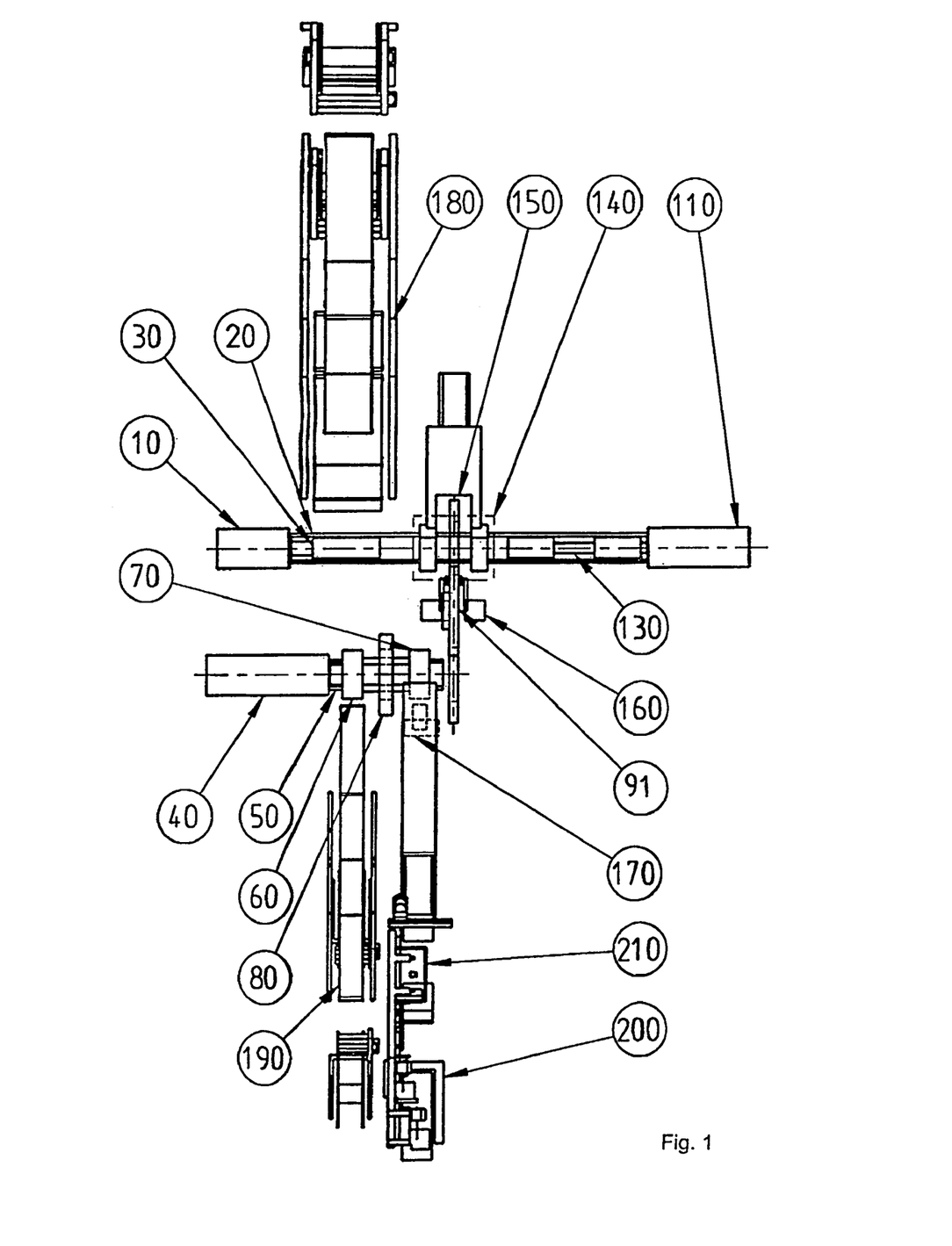
FIGS. 1 and 2 show schematically an assembly of devices for production of green tyres according to the invention in two structural arrangements.
Figure 3:
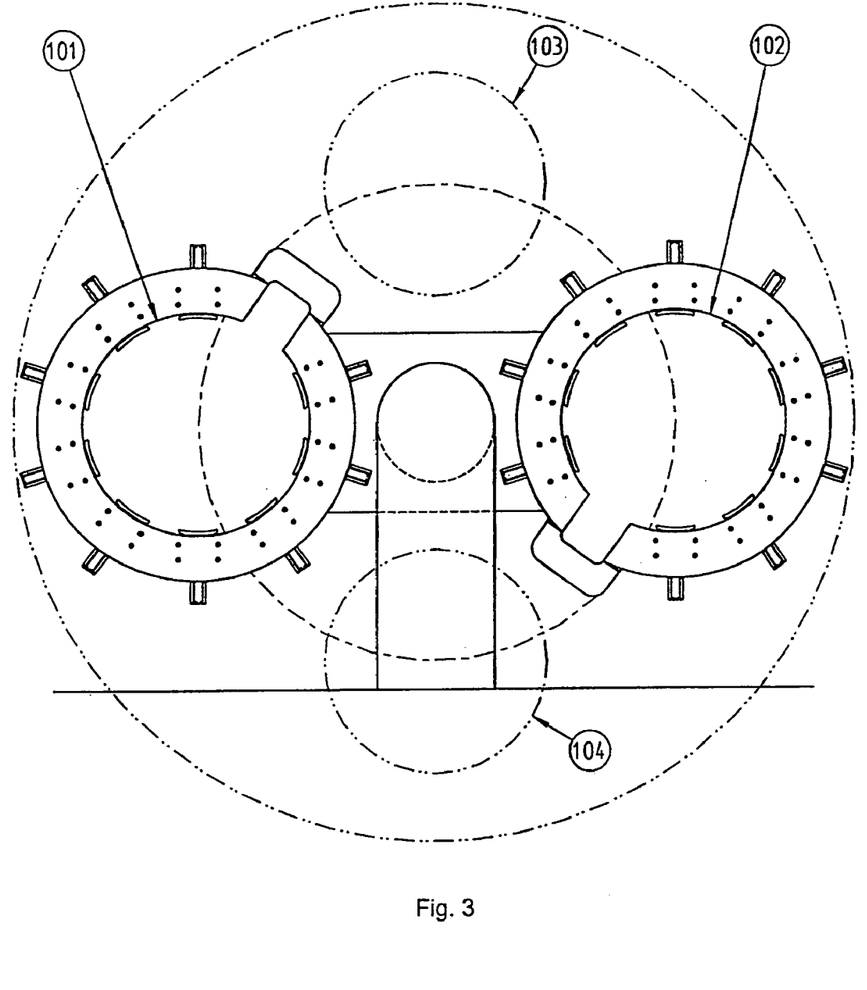
FIG. 3 shows schematically the transfer device.

The assembly of devices for production of green tyres, as shown in FIG. 1, consists, like the assembly of devices described in Example 1, of a track 20, where the same devices as described are disposed, the only difference being in the disposition of the stitching device 160, which is disposed from the inner side of the track 20, and in the disposition of the device 150 for supporting the bead cores and the carcass assembly, which is disposed at the completing place 140. The device 150 for supporting the bead cores and the carcass assembly leaves the completing place 140 only at the time of loading a new set of bead cores 2, along a short path, perpendicular to the first transfer track 20 at the completing place 140. On the track 50, there is disposed a machine house 40, carrying two building drums 60 and 70 on one axis on axially arranged shafts. Closer to the machine house 40, there is disposed a belt building drum 60, and the winding drum 70 for winding up the tread 7 and the narrow strip 6 to be spiralled is disposed further apart. Between the belt building drum 60 and the belt-tread building drum 70, there is a first transfer ring 80 movably located on the track 50, to transfer the belt from the building drum 60 onto the winding drum 70 to wind up the tread 7 and possibly also the narrow strip 6 to be spiralled by the winding device 170 for the narrow strip to be spiralled. The complete belt-tread assembly is taken over from the winding drum 70 by one of the transfer rings 101 to 104 of the transfer device 91, for example by the transfer ring 101, and at a suitable moment delivered by the transfer device (by rotation) to the completing place 140.

When the bead cores in the device 150 and the belt-tread assembly in the ring 101 have been prepared, the drum 30 transfers the carcass assembly into the device 150 for supporting and adjusting the bead cores and holding the carcass assembly, which is disposed at the completing place 140. After the building drum 30 has left the completing place 140, the tyre building drum 130 moves to the completing place 140, increases its diameter and clamps the carcass assembly with adjusted bead cores in the device 150 from the inner side, and the tyre building drum 130 returns to the starting position, while the belt-tread assembly remaines clamped on the tyre building drum 130. At that time one of the transfer rings 101 to 104 of the transfer device 91 moves to the completing place 140, for example the ring 101, carrying the belt-tread assembly. The tyre building drum 130 is the last, which is shifted to the completion place, and the tyre completion starts.

Having been completed, the complete tyre is removed by an operator or by a manipulator.

INDUSTRIAL APPLICABILITY

The invention concerns rubber industry and it is possible to utilize it exclusively for production of radial tyres for vehicles.

The invention claimed is:

1. An assembly of devices for production of green tyres, consisting of a belt building drum, a tread building drum, a carcass building drum and a tyre building drum, and further including devices for transferring particular semi-products from one device to another, a device for positioning and supporting bead cores and carcass assembly, a stitching device and material servisers, which are associated with the respective drums characterized in that the assembly is arranged on two parallel transfer tracks (20 and 50) and comprises:

on the first transfer track (20), a movably disposed carcass building drum (30) movable along the first transfer track (20), a movably disposed tyre building drum (130) movable along the first transfer track (20), which is oriented opposite to the carcass building drum (30), a device (150) for supporting and adjusting the bead cores and the carcass assembly being disposed between the carcass building drum (30) and the tyre building drum (130), on the second transfer track (50), a movably disposed belt building drum (60) movable along the second transfer track (50), a winding drum (70) for tread building between the movably disposed belt building drum (60) and the winding drum (70) being disposed a first transfer ring (80) to transfer a belt from the belt building drum (60) onto the winding drum (70), an auxiliary track (90), arranged perpendicularly to the first and second transfer track (20, 50) at a completing place (140), which is disposed on the first transfer track (20), wherein a second transfer ring (100) is disposed to deliver a belt-tread assembly to the completing place (140), as well as to remove a complete green tyre, a device (170) for spiralling a narrow strip together with a serviser for the narrow strip to be spiralled, which is associated with the winding drum (70), a serviser (180) for supplying materials for preparation of the carcass assembly to the carcass building drum (30), servisers (190) for supplying breaker plies to the belt building drum (60), a serviser (200) for supplying tread to the winding drum (70) for production of the belt-tread assembly, and a stitching device (160) for forming tyre edges, which is disposed close to the first transfer track (20) at the completing place (140).

2. An assembly of devices for production of green tyres according to claim 1, characterized in that the belt building drum (60) is carried by a shaft of a first machine house (40), which is movably disposed on the second transfer track (50), and the winding drum (70) for production of the belt-tread assembly is carried by a shaft of a second machine house (42), which is also movably disposed on the second transfer track (50), and the drums are arranged on one horizontal axis and oriented one against each other.

3. An assembly of devices for production of green tyres according to claim 1, characterized in that the belt building drum (60) and the winding drum (70) for production of the belt- tread assembly are carried by two independent, coaxially arranged shafts on one axis with a first machine house (40), which is movably disposed on the second transfer track (50), being arranged so that the belt building drum (60) is disposed closer to the machine house (40) and the windina drum (70) is arranged further apart from the machine house (40), and the first transfer ring (80) is movably disposed therebetween.

4. An assembly of devices for production of green tyres according to claim 1, characterized in that the device (150) for supporting and adjusting the bead cores and the carcass assembly, is movably disposed on the first transfer track (20) between the carcass building drum (30) and the tyre building drum (130).

5. An assembly of devices for production of green tyres according to claim 1, characterized in that the device (150) for supporting and adjusting the bead cores and holding the carcass assembly is disposed on the first transfer track (20) at the completing place (140).

6. An assembly of devices for production of green tyres according to claim 1, characterized in that the second transfer ring (100) for delivering the belt-tread assembly to the completing place (140), as well as for removing the complete green tyre, is movably suspended on the auxiliary track (90), which is arranged in a horizontal plane above the first and second transfer track (20, 50). and movable along the auxiliary track (90) in a vertical plane, perpendicular to the transfer tracks (20 and 50) and intersecting the first transfer track (20) at the completing place (140).

7. An assembly of devices for production of green tyres according to claim 1, characterized in that the auxiliary track (90) with the second transfer ring (100) is provided in the form of a transfer device (91), equipped with 2 to 4 transfer rings (101 to 104), which are regularly displaced and arranged rotationally around a rotation axis parallel to the first and second transfer track (20, 50), wherein the transfer rings (101 to 104) are rotationally disposed in a vertical plane, perpendicular to the rotation axis, as well as to both the first and the second transfer track (20, 50), wherein if one of the rings (101 to 104) extends to the completing place (140) and is disposed on one axis with the tyre building drum (130), the opposite ring (101 to 104) is disposed on the axis of the belt building and winding drums (60 and 70).

8. An assembly of devices for production of green tyres according to claim 1, characterized in that a stitching device (160) is disposed at the completing place from the outside of the first transfer track (20).

9. An assembly of devices for production of green tyres according to claim 1, characterized in that the stitching device (160) is disposed at the completing place (140) from the inner side of the first transfer track (20).

10. An assembly of devices for production of green tyres, characterized in that the assembly of devices is arranged on two parallel transfer tracks (20 and 50) and comprises:

on the first transfer track (20), a movably disposed carcass building drum (30) movable along the first transfer track (20), a movably disposed tyre building drum (130) movable along the first transfer track (20), which is oriented opposite to the carcass building drum (30), a device (150) for supporting and adjusting bead cores and a carcass assembly being movably disposed between the carcass building drum (30) and the tyre building drum (130), on the second transfer track (50), a movably disposed belt building drum (60) carried by a shaft of a machine house (40) and movable along the second transfer track (50), and a winding drum (70) for production of a belt-tread assembly carried by a shaft of a second machine house (42), which is also movably disposed to be movable along the second transfer track (50), and the drums are arranged on one horizontal axis and oriented one against each other, between the movably disposed belt building drum (60) and the winding drum (70) being disposed a first transfer ring (80) to transfer a belt from the belt building drum (60) onto the winding drum (70), an auxiliary track (90), arranged perpendicularly to the first and second transfer track (20, 50) in a horizontal plane above the first and second transfer track (20, 50) at a completing place (140), which is disposed on the first transfer track (20), wherein a second transfer ring (100) for delivering a belt-tread assembly to the completing place (140), as well as for removing a complete green tyre, is movably suspended on the auxiliary track (90) and arranged for moving along the auxiliary track (90) in a vertical plane, perpendicular to the transfer tracks (20 and 50) and intersecting the transfer track (20) at the completing place (140), a device (170) for spiralling a narrow strip together with a serviser for a narrow strip to be spiralled, which is associated with the winding drum (70), a serviser (180) for supplying materials for preparation of a carcass assembly to the carcass building drum (30), servisers (190) for supplying breaker plies to the belt building drum (60), a serviser (200) for supplying tread to the winding drum (70) for production of the belt-tread assembly, and a stitching device (160) for forming tyre edges, which is disposed at the completing place (140) from outside of the first transfer track (20).

11. A method for production of green tyres by applying to the assembly of devices according to claim 10, characterized in that the method includes the following steps:

belt preparation on the belt building drum (60), which is disposed on the second transfer track (50), by winding up a first and a second breaker ply delivered from breaker ply servisers;

belt transfer from the belt building drum (60) onto the winding drum (70) by a movement of the first transfer ring (80) on the second transfer track (50);

winding up the tread (7) onto the belt, wherein the tread is supplied from the tread serviser (200) and a belt-tread assembly results;

shifting the belt-tread assembly into the area of the auxiliary track (90);

clamping and transfer of the belt-tread assembly to the completing place (140) by the second transfer ring (100);

preparation of a carcass assembly, consisting of the tyre sidewalls, the inner rubber and one or two carcass plies, on the carcass building drum (30), disposed on the first transfer track (20), from carcass materials supplied by a combined serviser (180) of the carcass assembly;

transfer of the carcass assembly from the carcass building drum (30) into the device (150) for supporting and adjusting the bead cores and carcass assembly and adjusting the bead cores into a correct position;

transfer of the carcass assembly with adjusted bead cores by the device (150) for adjusting and supporting the bead cores and carcass assembly onto the tyre building drum (130) by a movement on the first transfer track to the completing place (140);

completion of the green tyre on the tyre building drum (130), including rotating the tyre building drum (130), inflating the carcass assembly, wrapping the bead cores, bringing them closer to each other and subsequent creating the tyre sidewalls and attaching the belt-tread assembly;

stitching the belt-tread assembly by the stitching device (160); and clamping and transfer of the completed green tyre by the second transfer ring (100) to a place, where it can be removed.

12. A method for production of green tyres according to claim 11, characterized in that after having transferred the belt onto the winding drum and before the tread building a narrow strip supplied from a serviser (210) is wound up on the belt in a spiralled manner by a winding device (170) for spiralling the narrow strip.

13. An assembly of devices for production of green tyres, characterized in that the assembly of devices is arranged on two parallel transfer tracks (20 and 50) and comprises:

on the first transfer track (20), a movably disposed carcass building drum (30) movable along the first transfer track (20), a movably disposed tyre building drum (130) movable along the first transfer track (20), which is oriented opposite to the carcass building drum (30), a device (150) for supporting and adjusting bead cores and carcass assembly being disposed between the carcass building drum (30) and the tyre building drum (130) at a completing place (140), on the second transfer track (50), a movably disposed belt building dwm (60) movable along the second transfer track (50), a winding drum (70) for tread building wherein the belt building drum (60) and the winding drum (70) for production of a belt-tread assembly are carried by two independent, coaxially arranged shafts on one axis with a machine house (40), which is movably disposed, being arranged so that the belt building drum (60) is disposed closer to the machine house (40) and the winding drum (70) is arranged further apart from the machine house (40), and a first transfer ring (80) is movably disposed therebetween, an auxiliary track (90), arranged perpendicularly to the first and second transfer track (20, 50) at the completing place (140), which is disposed on the first transfer track (20), wherein a second transfer ring (100) is provided in the form of a transfer device (91), equipped with 2 to 4 transfer rings (101 to 104), which are regularly displaced and arranged rotationally around a rotation axis parallel to the first and second transfer track (20, 50) and the transfer rings (101 to 104) are rotationally disposed in a vertical plane, perpendicular to the rotation axis, as well as to both the first and the second transfer track (20, 50) and if one of the rings (101 to 104) extends to the completing place (140) and is disposed on one axis with the tyre building drum (130), the opposite ring (101 to 104) is disposed on the axis of the belt building and winding drums (60 and 70), a device (170) for spiralling a narrow strip together with a serviser for the narrow strip to be spiralled, which is associated with the winding drum (70), a serviser (180) for supplying materials for preparation of a carcass assembly to the carcass building drum (30), servisers (190) for supplying breaker plies to the belt building drum (60), a serviser (200) for supplying tread to the winding drum (70) for production of the belt-tread assembly, and a stitching device (160) for forming the tyre edges, which is disposed at the completing place (140) from an inner side of the first transfer track (20) and below the transfer device (91).

14. A method for production of green tyres by applying to the assembly of devices according to claim 13, characterized in that it includes the following steps:

belt preparation on the belt building drum (60), which is disposed on the second transfer track (50), by winding up a first and subsequently a second breaker ply delivered from breaker ply servisers (190);

belt transfer from the belt building drum (60) onto the winding drum (70) by a movement of the first transfer ring (80) on the second transfer track (50);

winding up the tread (7) onto the belt, where the tread is supplied from the tread serviser (200) and a belt-tread assembly results;

shifting the belt-tread assembly into the area of one of the transfer rings (101 to 104) of the transfer device (91), which is currently present in the area of the second transfer track on the axis of the belt building and winding drums (60, 70);

preparation of a carcass assembly, consisting of tyre sidewalls, inner rubber and one or two carcass plies, on the carcass building drum (30), disposed on the first transfer track (20), from carcass materials supplied by a combined serviser (180) of the carcass assembly;

transfer of the carcass assembly by the carcass building drum (30) into the device (150) for adjusting and supporting the bead cores and carcass assembly and adjusting the bead cores into a correct position;

taking over the carcass assembly with adjusted bead cores by the tyre building drum (130) from the device (150) at the completing place (140) and transfer of the tyre building drum (130) to a starting position;

transfer of the belt-tread assembly to the completing place (140) by one of the transfer rings (101 to 104) of the transfer device (91);

transfer of the carcass assembly with adjusted bead cores to the completing place (140);

completion of the green tyre on the tyre building drum (130), including rotating the tyre building drum (130), inflating the carcass assembly, wrapping the bead cores, bringing them closer to each other and subsequent creating the tyre sidewalls and attaching the belt-tread assembly;

stitching the belt-tread assembly by the stitching device (160); and clamping and transfer of the completed green tyre by a transfer ring (101 to 104) of the transfer device (91) to a place, where it can be removed.

15. A method for production of green tyres according to claim 14, characterized in that after having transferred the belt onto the winding drum and before the tread building a narrow strip supplied from a serviser (210) is wound up on the belt in a spiralled manner by a winding device (170) for spiralling the narrow strip.

* * * * *